Patented Sept. 2, 1947

2,426,762

UNITED STATES PATENT OFFICE 2,426,762

COMPOSITION OF MATTER

Milton Chanin, Bronx, N. Y., assignor to Scientific Nutrition Corporation, New York, N. Y., a corporation of Delaware No Drawing. Application April 16, 1945, Serial No. 588,704

10 Claims. (Cl. 99—11)

The invention relates to a new and useful vitamin containing product and to a new and improved method of preparing said product.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel combinations, and improvements herein shown and described.

The present invention has for an object the provision of an improved food product containing a plurality of vitamins, some of which are incompatible with each other, so compounded as to maintain the vitamin potency over an extended period. A further object is to provide an improved method of preparing such a product.

Still another object is to include incompatible vitamins A and C in a single product.

Some of the vitamins, in addition to being susceptible to deterioration by oxidation in the presence of air or water, are incompatible in the presence of each other. Consequently they are often incorporated into separate products, or if they are incorporated in the same product, they cause each other to deteriorate in potency. This is particularly true of vitamins A and C.

In accordance with the present invention an oxidizable vitamin such as vitamin C mixed in a hydrogenated vegetable oil of relatively high melting point and comminuted into fine particles is dispersed in a lower melting point hydrogenated vegetable oil containing another vitamin such as vitamin A, the mixed vitamin bearing oils then being solidified, comminuted, and coated with a mineral enriched coating.

Such a product, according to the present invention is preferably prepared in accordance with the following method:

In order to prevent the oxidation of vitamin C, it is physically protected from oxygen and moisture by coating the vitamin C (ascorbic acid) with a hydrogenated vegetable oil of relatively high melting point. The oil is melted, and thoroughly mixed with the vitamin C and cooled until the oil solidifies. The mix is then allowed to stand until it is a hard, brittle, homogeneous mass. It is then comminuted to obtain small, uniform granules.

The comminuted vitamin C bearing oil is then added to a hydrogenated vegetable oil having a lower melting point at a temperature intermediate the melting points of the oil, and to this is added vitamin A, and antioxidants such as lecithin, vitamin E, and other desired vitamins and flavorings. After thorough mixing, the mass is cooled and may then be mixed with such minerals and flavorings as desired and compressed, if wafers or tablets are to be made.

It will be understood that the foregoing general description and the following detailed description as well are exemplary and explanatory of the invention but are not restrictive thereof.

Referring now in detail to the present preferred manner of carrying out the method of the present invention, vitamin C (980 g.) is coated with a hydrogenated vegetable oil (400 g.) having a relatively high melting point of approximately 140° F. The oil is melted and placed in the bowl of a mixer with the vitamin C and the stirring action is started, and continued until the oil cools and resolidifies. The mix is then allowed to stand until it becomes a hard, brittle, homogeneous mass. It is then comminuted to small uniform granules.

These granules are then placed in a mixer kettle. To this is added a previously made mix of vitamin D (52 g.) and vitamin E (350 g.) containing 40 g. of lecithin and other antioxidants. The stirring action is started and three pounds of a vitamin B complex mix is added. Then in sequence is added 1400 g. of a melted hydrogenated vegetable oil having a relatively low melting point (approximately 115° F.), cocoa, and 5500 g. of a vitamin A material in which the vitamin is preferably absorbed on a carrier such as soya flour.

These ingredients are thoroughly mixed and the mass is then cooled, and comminuted to form very fine granules.

These granules are then thoroughly mixed with approximately 52 pounds of a mixture of desired mineral salts and flavorings. Thus, the mineral salts, although distributed throughout the mass, are mechanically separate from the vitamins, and have no deleterious effect on them. The final mix is then tableted into wafers.

The invention in its broader aspects is not limited to the specific combinations and improvements described but departures may be made therefrom within the scope of the accompanying claims without departing from the principles of the invention and without sacrificing its chief advantages.

What is claimed is:

1. The process of incorporating incompatible vitamins in one product by adding one vitamin to a hydrogenated vegetable oil having a relatively low melting point, adding another vitamin to a hydrogenated vegetable oil having a higher melting point, comminuting the latter, and mixing it with the former at a temperature intermediate the melting points of the oils.

2. The process of incorporating incompatible vitamins in one product by dissolving one vitamin in a hydrogenated vegetable oil having a relatively low melting point and coating another vitamin with a hydrogenated vegetable oil having a higher melting point, comminuting the latter, and mixing it with the former at a temperature intermediate the melting points of the two oils.

3. The process of incorporating vitamins A and C in one product by dissolving one of them in a hydrogenated vegetable oil having a relatively low melting point and coating the other with a hydrogenated vegetable oil having a higher melting point, comminuting the latter and mixing it with the former at a temperature intermediate the melting points of the two oils.

4. The process of incorporating vitamins A and C in one product by dissolving the vitamin A in a hydrogenated vegetable oil having a melting point of approximately 115° F. and coating the vitamin C with a hydrogenated vegetable oil having a melting point of approximately 140° F., comminuting the latter and mixing it with the former at a temperature intermediate 115° F. and 140° F.

5. The process of incorporating incompatible vitamins in one product by adding one vitamin to a hydrogenated vegetable oil having a relatively low melting point, adding another to a hydrogenated vegetable oil having a higher melting point, comminuting the latter and mixing it with the former at a temperature intermediate the melting points of the two oils, cooling the mixed vitamin bearing oils, comminuting the mixed oils, and coating the comminuted mixture with a mineral enriched coating.

6. A vitamin product containing incompatible vitamins, comprising particles of a hydrogenated vegetable oil having a relatively high melting point containing one of the vitamins, said particles being distributed throughout a hydrogenated vegetable oil having a lower melting point which contains the other vitamin.

7. A vitamin product containing vitamins A and C, comprising particles of a hydrogenated vegetable oil having a relatively high melting point containing one of the vitamins, said particles being distributed throughout a hydrogenated vegetable oil of lower melting point which contains the other vitamin.

8. A vitamin product containing vitamins A and C, comprising particles of a hydrogenated vegetable oil having a relatively high melting point containing vitamin C, said particles being distributed throughout a hydrogenated vegetable oil of lower melting point containing vitamin A in solution.

9. A vitamin product containing vitamins A and C, comprising particles of a hydrogenated vegetable oil having a melting point of approximately 140° F. containing the vitamin C, said particles being distributed throughout a hydrogenated vegetable oil having a melting point of approximately 115° F. containing the vitamin A in solution.

10. A vitamin product containing incompatible vitamins, comprising particles of a hydrogenated vegetable oil having a relatively high melting point containing one of the vitamins, said particles being distributed throughout a hydrogenated vegetable oil having a lower melting point which contains the other vitamin, the comminuted mixed vitamin bearing oils coated with a mineral enriched coating.

MILTON CHANIN.

REFERENCES CITED

The following references are of record in the file of this patent:

UNITED STATES PATENTS

| Number | Name | Date |
|---|---|---|
| 1,633,711 | Prince | June 28, 1927 |
| 1,764,085 | Placak | June 17, 1930 |
| 1,879,762 | Nitardy | Sept. 27, 1932 |
| 2,348,503 | Taylor | May 9, 1944 |
| 2,170,155 | Musher | Aug. 22, 1939 |
| 1,286,904 | Atkinson | Dec. 10, 1918 |
| 1,264,592 | Atkinson | Apr. 30, 1918 |
| 2,359,413 | Freedman | Oct. 3, 1944 |